(12) United States Patent
Hock

(10) Patent No.: US 6,888,801 B1
(45) Date of Patent: May 3, 2005

(54) DEVICES, SOFTWARE AND METHODS FOR DETERMINING A QUALITY OF SERVICE FOR A VOIP CONNECTION

(75) Inventor: Thomas J. Hock, Chapel Hill, NC (US)

(73) Assignee: Cisco Systems, Inc., San Jose, CA (US)

( * ) Notice: Subject to any disclaimer, the term of this patent is extended or adjusted under 35 U.S.C. 154(b) by 762 days.

(21) Appl. No.: 09/698,885

(22) Filed: Oct. 27, 2000

(51) Int. Cl.[7] .............................................. H04L 12/58
(52) U.S. Cl. ...................................... 370/252; 370/352
(58) Field of Search ................................. 370/252, 352, 370/441

(56) References Cited

U.S. PATENT DOCUMENTS 6,522,658 B1 * 2/2003 Roccanova ................. 370/441
6,574,216 B1 * 6/2003 Farris et al. ................ 370/352

* cited by examiner

Primary Examiner—Salvatore Cangialosi
(74) Attorney, Agent, or Firm—Marger, Johnson & McCollom P.C.

(57) ABSTRACT

Devices, software and methods are provided for determining a quality of service for a Voice over Internet Protocol (VoIP) connection. A round trip time of packets is measured between the devices that are exchanging voice data. In addition, at least one performance parameter is determined, such as packet delay or packet loss. A quality of service is then determined from the round trip time and the performance parameter.

38 Claims, 2 Drawing Sheets

DEVICES, SOFTWARE AND METHODS FOR DETERMINING A QUALITY OF SERVICE FOR A VOIP CONNECTION

BACKGROUND OF THE INVENTION

1. Field of the Invention

The present invention is related to the field of network telephony, and more specifically to devices, software and methods for determining a quality of voice connection between network devices.

2. Description of the Related Art

The internet is used for telephony, in addition to setting data. Accordingly, voice is encoded into digital data, the data is arranged in packets, and the packets are transmitted to the recipient over a network. The process has to happen in real time, which means that the familiar Transmission Control Protocol/Internal Protocol (TCP/IP) can not be used. Instead, other protocols are used, which permit real time use, such as the Uniform Datagram Protocol (UDP).

A disadvantage of protocols that permit real time use is that they are unreliable, in that they permit packets to be lost, without retrieving them. When that happens, the voice segments they were carrying are not reconstructed. If these are many, then the recipient hears annoying gaps in the reconstructed speech.

BRIEF SUMMARY OF THE INVENTION

The present invention overcomes these problems and limitations of the prior art.

Generally, the present invention provides devices, software and methods for determining a quality of service for a Voice over Internet Protocol (VoIP) connection. Corrective measures can be taken if the quality of service is determined to be below a threshold.

The devices, software and methods of the invention measure a round trip time of packets between the devices that are exchanging voice data, and also at least one performance parameter. A quality of service is then determined from the round trip time and the performance parameter.

The invention will become more readily apparent from the following Detailed Description, which proceeds with reference to the drawings, in which:

DETAILED DESCRIPTION OF THE PREFERRED EMBODIMENT(S)

As has been mentioned, the present invention provides devices, software and methods for determining a quality of service for a Voice over Internet Protocol (VoIP) connection. The invention is now described in more detail.

Figure 1:
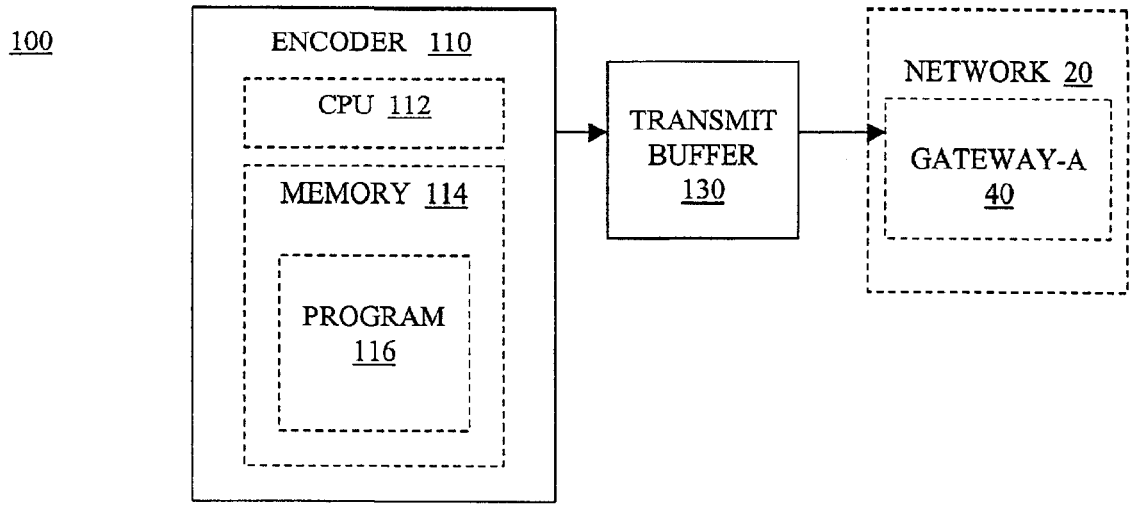
FIG. 1 is a block diagram of a transmitting device made according to an embodiment of the invention.

Referring to FIG. 1, a transmitting device 100 made according to an embodiment of the invention is described. Device 100 is for transmitting voice packets through a network 20. Device 100 preferably transmits the voice packets to a network switch 40, such as Gateway-A 40, of the network 20.

One or more of the components of device 100 can be implemented in combination with each other, consistently with components of this description. For example, device 100 can be implemented as part of a larger Digital Signal Processing (DSP) architecture.

In the embodiment of FIG. 1, device 100 includes an encoder 110 for encoding a frame of voice data into a voice packet. Encoder 110 includes a processor 112, which is also referred to as Central Processing Unit (CPU) 112, and a memory 114. The processor 112 is adapted to perform the method of the invention. Preferably it is so adapted by running a program 116 made according to the invention, which resides on memory 114.

In addition, device 100 optionally includes a transmit buffer 130 adapted to receive inputs from the encoder 110, for storing the encoded frames prior to transmitting.

Device 100 includes a network interface (not shown separately) for interfacing with network 20. The network interface can be implemented as a stand-alone feature, or in conjunction with another component, such as transmit buffer 130.

Figure 2:
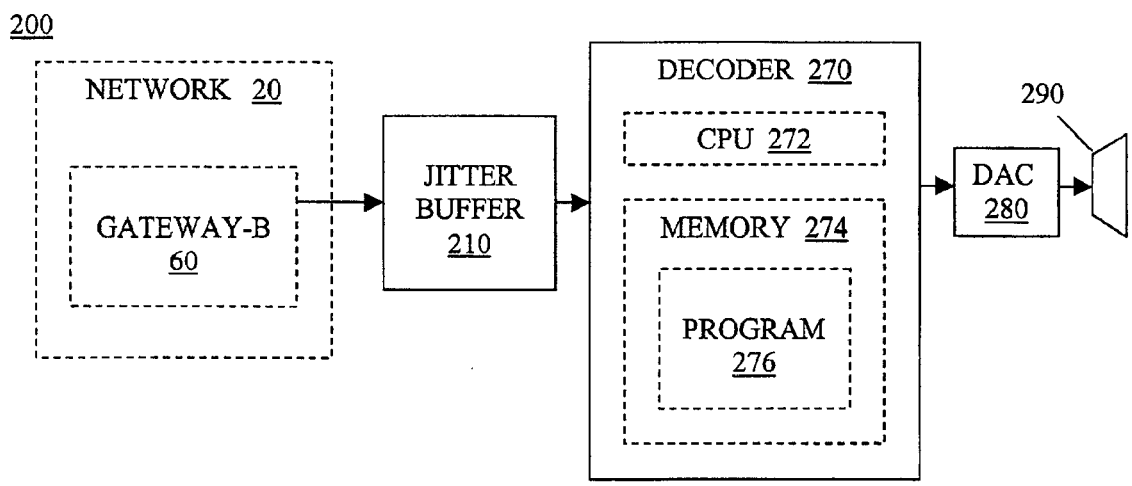
FIG. 2 is a block diagram of a receiving device made according to another embodiment of the invention.

Referring to FIG. 2, a receiving device 200 according to the invention is described. One or more of the components of device 200 can be implemented in combination with each other, consistently with components of this description. For example, device 200 can be implemented as part of a larger Digital Signal Processing (DSP) architecture.

In the embodiment of FIG. 2, device 200 includes a jitter buffer 210. This stores a number of frames as they are received from the network 20. The jitter buffer thus prevents an anomaly that could be experienced, if frames were played out exactly when they are received. Due to the nature of transmission through the network 20, they can be received in bunches, with gaps between the bunches. Jitter buffer 210 permits playing them out at a regular pace, notwithstanding when exactly they are received.

Device 200 also includes a decoder 270. Decoder 270 includes a processor 272, which is also referred to as Central Processing Unit (CPU) 272, and a memory 274. The processor 272 is adapted to perform the method of the invention. Preferably it is so adapted by running a program 276 made according to the invention, which resides on memory 274.

Device 200 can also include other components, such as a Digital to Analog Converter (DAC) 280. This converts the decoded voice data into an analog signal, which can be input in a speaker 290.

Device 200 includes a network interface (not shown separately) for interfacing with network 20. The network interface can be implemented as a stand-alone feature, or in conjunction with another component, such as jitter buffer 210. Device 200 is deemed to interface with a network switch 60, such as Gateway-B 60, of network 20.

As an example, a device that may incorporate aspects of the present invention would be an Internet Protocol (IP) telephone. Its transmitting side could include device 100 of FIG. 1, while its received side could include device 200 of FIG. 2.

A device of the invention need not be limited to two-way voice communication. Devices, software and methods for one way transmitting, such a broadcasting, are also included.

It is readily apparent that the present invention can be implemented by one or more devices that include logic circuitry. It can also be implemented by a device that includes a dedicated processor system, that can include a microcontroller or a microprocessor.

The invention additionally provides methods, which are described below. Moreover, the invention provides apparatus that performs, or assists in performing the methods of the invention. This apparatus may be specially constructed for the required purposes, or it may comprise a general-purpose computer selectively activated or reconfigured by a computer program stored in the computer. The methods and algorithms presented herein are not necessarily inherently related to any particular computer or other apparatus. In particular, various general-purpose machines may be used with programs in accordance with the teachings herein, or it may prove more convenient to construct more specialized apparatus to perform the required method steps. The required structure for a variety of these machines will appear from this description.

Useful machines or articles for performing the operations of the present invention include general-purpose digital computers or other similar devices. In all cases, there should be borne in mind the distinction between the method of operating a computer and the method of computation itself. The present invention relates also to method steps for operating a computer and for processing electrical or other physical signals to generate other desired physical signals.

The invention additionally provides a program, and a method of operation of the program. The program is most advantageously implemented as a program for a computing machine, such as a general purpose computer, a special purpose computer, a microprocessor, etc.

The invention also provides a storage medium that has the program of the invention stored thereon. The storage medium is a computer-readable medium, such as a memory, and is read by the computing machine mentioned above.

A program is generally defined as the sequence of steps leading to a desired result. These steps, also known as instructions, are those requiring physical manipulations of physical quantities. Usually, though not necessarily, these quantities take the form of electrical or magnetic signals capable of being stored, transferred, combined, compared, and otherwise manipulated or processed. When stored, they can be stored it may computer-readable medium. It is convenient at times, principally for reasons of common usage, to refer to these signals as bits, data bits, samples, values, elements, symbols, characters, images, terms, numbers, or the like. It should be borne in mind, however, that all of theses and similar terms are associated with the appropriate physical quantities, and that these terms are merely convenient labels applied to these physical quantities.

This detailed description is presented largely in terms of flowcharts, display images, algorithms, and symbolic representations of operations of data bits within a computer readable medium, such as a memory. Such descriptions and representations are the type of convenient labels used by those skilled in programming and/or the data processing arts to effectively convey the substance of their work to others skilled in the art. A person skilled in the art of programming can use this description to readily generate specific instructions for implementing a program according to the present invention. For the sake of economy, however, flowcharts used to describe methods of the invention are not repeated in this document for describing software according to the invention.

Often, for the sake of convenience only, it is preferred to implement and describe a program as various interconnected distinct software modules or features, collectively also known as software. This is not necessary, however, and there may be cases where modules are equivalently aggregated into a single program with unclear boundaries. In any event, the software modules or features of the present invention can be implemented by themselves, or in combination with others. Even though it is said that the program can be stored in a computer-readable medium, it should be clear to a person skilled in the art that it need not be a single memory, or even a single machine. Various portions, modules or features of it can reside in separate memories, or even separate machines. The separate machines may be connected directly, or through a network, such as a local access network (LAN), or a global network, such as the Internet.

In the present case, methods of the invention are implemented by machine operations. In other words, embodiments of the program of the invention are made such that they perform methods of the invention that are described in this document. These can be optionally performed in conjunction with one or more human operators performing some, but not all of them. As per the above, the users need not be collacated with each other, but each only with a machine that houses a portion of the program. Alternately, some of these machines can operate automatically, without users and/or independently from each other.

Figure 3:
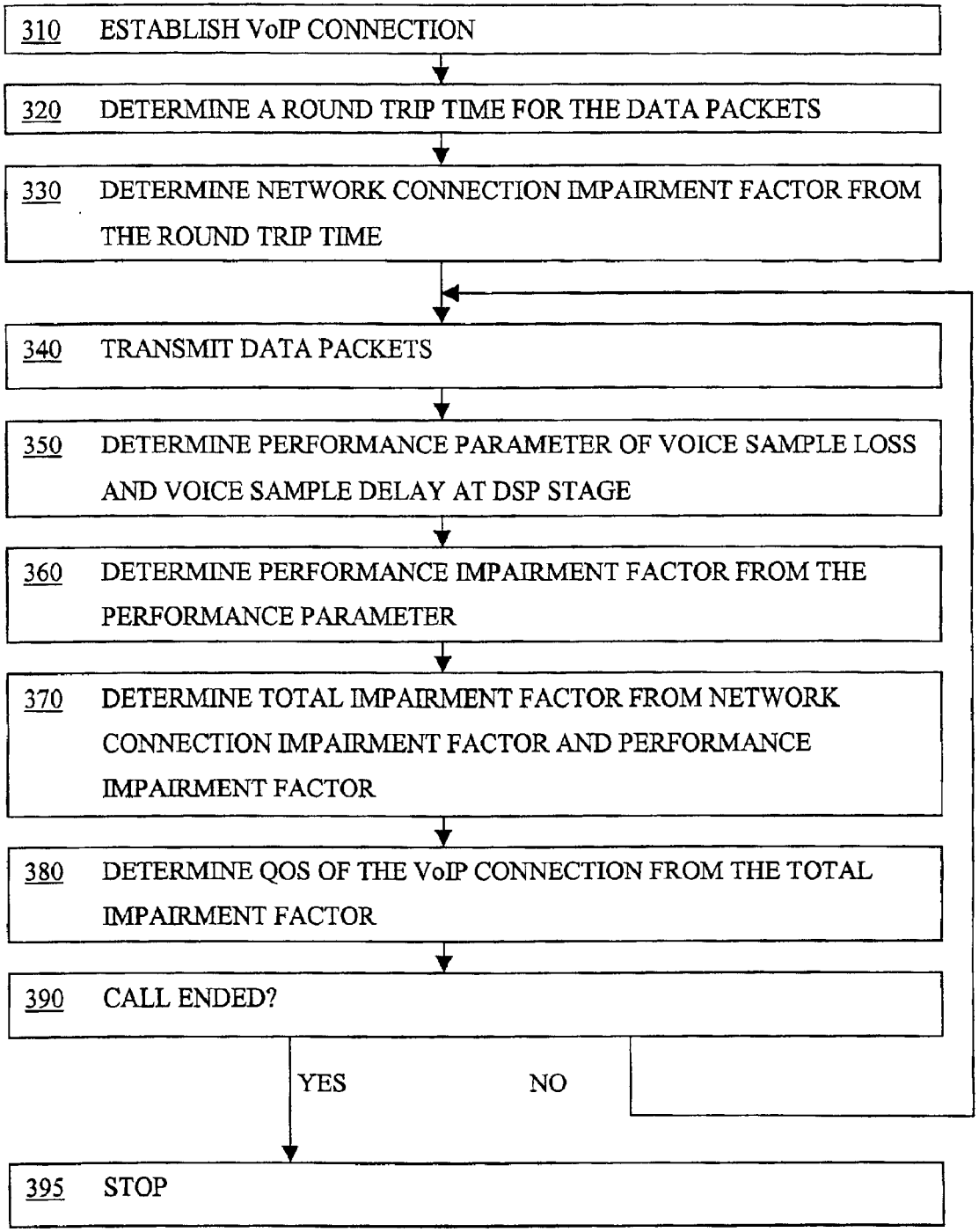
FIG. 3 is a flowchart illustrating a method according to an embodiment of the invention.

Referring now to FIG. 3, a flowchart 300 is used for illustrating a method of the invention.

According to a box 310, a Voice over Internet Protocol (VoIP) connection is established between a first device and a second device. For purposes of interpreting this document, the first device can be either device 100 or Gateway-A 40, and the second device can be either device 200 or Gateway-B 60. In any one of these cases, the connection can be established through the network 20, and is for exchanging data packets that represent voice.

According to a next box 320, a round trip time RTT is determined for data packets being exchanged through the connection. This can be a single time, and measured by sending and receiving back a scout packet.

According to a next box 330, a network connection impairment factor Idd is determined from the round trip time RTT. This box is not necessary for performing the invention, but a preferred embodiment of quantifying the round trip time RTT, for ultimately determining the quality of service of the connection. Since it is associated with a delay, the network connection impairment factor Idd may be determined by dividing the RTT by 2. Other factors can be added in, such as known delay times. Such delay times can be a receive delay, and a fixed coder-decoder ("codec") delay.

According to a next box 340, transmission of the data packets along the connection starts. More particularly, at least some data packets are transmitted.

According to a next box 350, at least one performance parameter is determined from transmitting the data packets. A distinct advantage of the invention is that the performance parameter is determined at a digital signal processing (DSP) stage. More particularly, the performance parameter can be determined from a voice sample loss, or from a voice sample delay at the DSP stage, or both.

For any one of these embodiments, the size of a jitter buffer may make a difference. Larger packet payloads may delay a packet, and fill the jitter buffer faster. In addition, a packet is deemed lost if it arrives too late for being played out.

According to a next box 360, a performance impairment factor Ie is determined from the performance parameter. This box is not necessary for performing the invention, but a preferred embodiment of quantifying the performance parameter, for ultimately determining the quality of service of the connection.

In one embodiment, packet loss can be quantified by adding together irregular gaps, that is those filled with silence, interpolation, prediction and redundancy. Then Ie can be computed as a function of the quantified loss.

Then according to the invention, a quality of service of the connection is determined from the round trip time and the performance parameter. In the preferred embodiment, this happens as follows:

According to a next box 370, a total impairment factor Itot is determined from the performance impairment factor Ie and the network connection impairment factor Idd. Then according to a next box 380, the quality of service is determined from the total impairment factor Itot.

There are a number of ways for determining the total impairment Itot. In the preferred embodiment, the network connection impairment factor Idd is added together with the performance impairment factor Ie. Other factors can also be added or subtracted for the total impairment factor Itot.

According to a next box 390, it is inquired whether the call over the connection has ended. If yes, then according to a next box 395, execution stops.

If the call has not ended, execution returns to box 340. Additional data packets are transmitted, and then an updated performance parameter is determined for the additional data packets. Accordingly, updated quality of service of the connection can be computed from the updated performance parameter.

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

While the invention has been disclosed in its preferred form, the specific embodiments thereof as disclosed and illustrated herein are not to be considered in a limiting sense. Indeed, it should be readily apparent to those skilled in the art in view of the present description that the invention can be modified in numerous ways. The inventor regards the subject matter of the invention to include all combinations and subcombinations of the various elements, features, functions and/or properties disclosed herein.

The following claims define certain combinations and subcombinations, which are regarded as novel and non-obvious. Additional claims for other combinations and subcombinations of features, functions, elements and/or properties may be presented in this or a related document.

The invention claimed is:

1. A device comprising:
    a network interface for coupling to a network; and
    a processor used for encoding voice data into data packets and coupled with the network interface, wherein the processor is adapted to:
        establish a connection through the network for exchanging the data packets that represent voice between the device and a corresponding device;
        determine a round trip time for data packets being exchanged through the connection using the same processor that encodes the voice data;
        determine at least one performance parameter from transmitting a plurality of data packets along the connection using the same processor that encodes the voice data; and
        determine a quality of service of the connection from the round trip time and the performance parameter.

2. The device of claim 1, wherein
    the performance parameter is determined from a voice sample delay at the digital signal processing stage.

3. The device of claim 1, wherein
    the performance parameter is determined from a voice sample loss at the digital signal processing stage.

4. The device of claim 1, wherein the processor is further adapted to:
    determine a network connection impairment factor from the round trip time; and
    determine a performance impairment factor by quantifying the performance parameter,
    wherein the quality of service is determined from the network connection impairment factor and the performance impairment factor.

5. The device of claim 4, wherein
    the performance impairment factor is determined according to silence, redundancy, interpolation and prediction characteristics of the data packets using the same processor that encodes the voice data,
    the quality of service is determined by adding together the network connection impairment factor and the performance impairment factor.

6. The device of claim 1, wherein the processor is further adapted to:
    determine an updated performance parameter from transmitting a plurality of additional data packets; and
    determine an updated quality of service of the connection from the updated performance parameter.

7. An article comprising: as storage medium, said storage medium having stored thereon instructions, that, when executed by a first device, result in:
    establishing a connection through a network for exchanging data packets that represent voice between the first device and a second device;
    determining a round trip time for data packets being exchanged through the connection;
    determining at least one performance parameter from transmitting a plurality of data packets along the connection, the performance parameter determined in a same digital signal processing stage used for compressing or decompressing voice signals into the data packets; and
    determining a quality of service of the connection from the round trip time and the performance parameter.

8. The article of claim 7, wherein
    the performance parameter is determined from a voice sample delay at the digital signal processing stage.

9. The article of claim 7, wherein
    the performance parameter is determined from a sample loss at the digital signal processing stage.

10. The article of claim 7, wherein the instructions further result in:
    determining a network connection impairment factor from the round trip time; and
    determining a performance impairment factor by quantifying the performance parameter;
    wherein the quality of service is determined from the network connection impairment factor and the performance impairment factor.

11. The article of claim 10, wherein
    the performance impairment factor is determined according to silence, redundancy, interpolation and prediction characteristics of the data packets in the same digital signal processing stage used for compressing or decompressing voice signals into the data packets, the quality of service is determined by adding together the network connection impairment factor and the performance impairment factor.

12. The article of claim 7, wherein the instructions further result in:

determining an updated performance parameter from transmitting a plurality of additional data packets; and determining an updated quality of service of the connection from the updated performance parameter.

13. A device comprising:

means for coupling to a network;

means for establishing a connection through the network for exchanging data packets that represent voice between the device and a corresponding device;

means for determining a round trip time for data packets being exchanged through the connection;

means for determining at least one performance parameter from transmitting a plurality of data packets along the connection, the performance parameter using a same digital signal processing stage used for encoding voice signals into the data packets; and means for determining a quality of service of the connection from the round trip time and the performance parameter.

14. The device of claim 13, wherein the performance parameter is determined from a voice sample delay at the digital signal processing stage.

15. The device of claim 13, wherein the performance parameter is determined from a voice sample loss at the digital signal processing stage.

16. The device of claim 13, further comprising:

means for determining a network connection impairment factor from the round trip time; and means for determining a performance impairment factor by quantifying the performance parameter, wherein the quality of service is determined from the network connection impairment factor and the performance impairment factor.

17. The device of claim 16, wherein the performance impairment factor is determined according to silence, redundancy, interpolation and prediction characteristics of the data packets in the same digital signal processing stage used for encoding voice signals into the data packets, the quality of service is determined by adding together the network connection impairment factor and the performance impairment factor.

18. The device of claim 13, further comprising:

means for determining an updated performance parameter from transmitting a plurality of additional data packets; and means for determining an updated quality of service of the connection from the updated performance parameter.

19. A method comprising:

establishing a connection through a network for exchanging data packets that represent voice between a first device and a second device;

determining a round trip time for data packets being exchanged through the connection;

transmitting a plurality of the data packets along the connection;

determining at least one performance parameter from transmitting the data packets, the performance parameter determined in a same digital signal processing stage used for compressing and decompressing voice signals into the data packets; and determining a quality of service of the connection from the round trip time and the performance parameter.

20. The method of claim 19, wherein:

the performance parameter is determined from a voice sample delay at a digital signal processing stage.

21. The method of claim 19, wherein:

the performance parameter is determined from a voice sample loss at a digital signal processing stage.

22. The method of claim 19, further comprising:

determining a network connection impairment factor from the round trip time; and determining a performance impairment factor by quantifying the performance parameter;

wherein the quality of service is determined from the network connection impairment factor and the performance impairment factor.

23. The method of claim 22, wherein:

the performance impairment factor is determined according to silence, redundancy, interpolation and prediction characteristics of the data packets in the same digital signal processing stage used for compressing and decompressing voice signals into the data packets, the quality of service is determined by adding together the network connection impairment factor and the performance impairment factor.

24. The method of claim 19, further comprising:

transmitting additional data packets;

determining an updated performance parameter from transmitting the additional data packets; and determining an updated quality of service of the connection from the updated performance parameter.

25. A method comprising:

establishing a connection through a network;

exchanging data packets that contain voice data over the connection;

determining a round trip time for transmitting data packets over the connection;

determining at least one performance parameter associated with transmitting a plurality of the data packets over the connection;

taking into account how transmitting the data packets over the connection affect performance of a digital signal processing stage used for encoding or decoding the voice data when determining the performance parameter; and determining a quality of service of the connection from the round trip time and the performance parameter.

26. The method according to claim 25 wherein a processor used for determining the performance parameter is a same digital signal processor used for encoding or decoding the voice data during the digital data signal processing stage.

27. The method according to claim 25 wherein a processor used for determining the performance parameter is embedded in an edge device used for initiating a Voice Over Internet Protocol (VoIP) call over the network.

28. The method according to claim 27 wherein the edge device is a Voice Over Internet Protocol (VoIP) phone.

29. The method according to claim 25 including calculating the performance parameter according to a voice sample loss in the digital signal processing stage.

30. The method according to claim 25 including calculating the performance parameters according to a voice sample delay in the digital signal processing stage.

31. The method according to claim 25 including:
- determining a network connection impairment factor from the round trip time for sending and receiving back the data packets;
- determining a performance impairment factor by quantifying the performance parameter; and
- determining a quality of service according to the network connection impairment factor and the performance impairment factor.

32. A network processing device, comprising:
- a processor taking into account how transmitting data packets over a network effects voice samples in a digital signal processing stage when calculating performance parameters for the data packets and then determining a quality of service of the network from the performance parameters, the digital signal processing stage encoding the voice samples into data for the data packets or decoding the data from the data packets back into voice samples.

33. The network processing device according to claim 32 wherein the processor calculates the performance parameters according to a voice sample loss in the digital signal processing stage.

34. The network processing device according to claim 32 wherein the processor calculates the performance parameters according to a voice sample delay in the digital signal processing stage.

35. The network processing device according to claim 32 wherein a processor used for determining the performance parameters is embedded in an edge device used for initiating a Voice Over Internet Protocol (VoIP) call over the network.

36. The network processing device according to claim 35 wherein the edge device is a Voice Over Internet Protocol (VoIP) phone.

37. The network processing device according to claim 32 wherein the processor:
- establishes a connection through the network for exchanging the data packets;
- determines a round trip time for the data packets being exchanged through the connection;
- determines a connection impairment factor from the round trip time; and
- determines a quality of service of the connection from the round trip time and the performance parameter.

38. The network processing device according to claim 37 wherein the processor determines the performance impairment factor according to silence, redundancy, interpolation and prediction characteristics of the data packets.

* * * * *

UNITED STATES PATENT AND TRADEMARK OFFICE
CERTIFICATE OF CORRECTION

PATENT NO. : 6,888,801 B1  Page 1 of 1
APPLICATION NO. : 09/698885
DATED : May 3, 2005
INVENTOR(S) : Hock It is certified that error appears in the above-identified patent and that said Letters Patent is hereby corrected as shown below:

At column 1, line 14, please replace "to setting data." with --to sending data.--

At column 1, line 17, please replace "The process" with --This process--

At column 2, line 58, please replace "its received side" with --its receiving side--

At column 2, line 61, please replace "a broadcasting" with --as broadcasting--

At column 3, line 40, please replace "it may computer" with --in any computer--

At column 5, line 17, please replace "impairment Itot" with --impairment factor Itot--

At column 6, line 33, please replace "as storage " with --a storage--

At column 6, line 61, please replace "parameter," with --parameter;--

At column 8, line 16, please replace "parameter;" with --parameter,--

At column 8, line 55, please replace "digital data signal" with --digital signal--

At column 9, line 7, please replace "a quality" with --the quality--

Signed and Sealed this

Third Day of October, 2006

JON W. DUDAS
*Director of the United States Patent and Trademark Office*